US009678684B2

(12) United States Patent
Afriat

(10) Patent No.: US 9,678,684 B2
(45) Date of Patent: Jun. 13, 2017

(54) SYSTEMS AND METHODS FOR PERFORMING AN ADAPTIVE SUSTAIN WRITE IN A MEMORY SYSTEM

(71) Applicant: SanDisk Technologies Inc., Plano, TX (US)

(72) Inventor: Itshak Afriat, Sunnyvale, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 43 days.

(21) Appl. No.: 14/877,327

(22) Filed: Oct. 7, 2015

(65) Prior Publication Data

US 2017/0102877 A1    Apr. 13, 2017

(51) Int. Cl.
*G06F 3/06* (2006.01)
*G06F 12/02* (2006.01)

(52) U.S. Cl.
CPC ............ *G06F 3/064* (2013.01); *G06F 3/0604* (2013.01); *G06F 3/0613* (2013.01); *G06F 3/0679* (2013.01); *G06F 12/0246* (2013.01)

(58) Field of Classification Search
CPC ...... G06F 3/064; G06F 3/0613; G06F 3/0679; G06F 12/0246
See application file for complete search history.

(56) References Cited

U.S. PATENT DOCUMENTS

2015/0113223 A1* 4/2015 Brown .................. G06F 12/023
711/133
2016/0162205 A1* 6/2016 Grimsrud .............. G06F 3/0616
711/103

\* cited by examiner

*Primary Examiner* — Hal Schnee
(74) *Attorney, Agent, or Firm* — Brinks Gilson & Lione

(57) ABSTRACT

Systems and methods for performing an adaptive sustain write are disclosed. In one implementation, a controller of a non-volatile memory that is coupled with a host system monitors a rate at which the host system sends user data to the non-volatile memory system for storage and determines that the rate at which the host system sends user data to the non-volatile memory system for storage exceeds a threshold. The controller stores a first portion of the user data in one or more user capacity memory blocks of the non-volatile memory system. Additionally, the controller stores a second portion of the user data in one or more over-provisioning memory blocks of the non-volatile memory system after determining that the rate at which the host system sends data to the non-volatile memory system for storage exceeds the threshold.

20 Claims, 8 Drawing Sheets

SYSTEMS AND METHODS FOR PERFORMING AN ADAPTIVE SUSTAIN WRITE IN A MEMORY SYSTEM

BACKGROUND

Non-volatile memory systems often include multiple types of memory units, such as user capacity memory blocks and over-provisioning memory blocks. User capacity memory blocks are generally memory blocks that the non-volatile memory system makes available to a host device for the storage of user data. Over-provisioning memory blocks are generally spare memory blocks that the non-volatile memory system maintains for uses other than storing user data, such as a workspace for performing background operations such as garbage collection operations and data reconciliation operations.

In conventional non-volatile memory systems, as a host system sends data to the non-volatile memory system for storage, a controller of the memory system directly stores that data in the user capacity memory blocks. Accordingly, the rate at which the non-volatile memory system may receive data from the host system for storage at the memory system may be limited by the speed at which the controller may store data to the user capacity memory blocks.

As the performance of host systems increase, it is desirable for non-volatile memory systems to increase the amount of data that the memory system may accept from the host system for storage in a given period of time.

DETAILED DESCRIPTION OF THE DRAWINGS

Figure 1A:
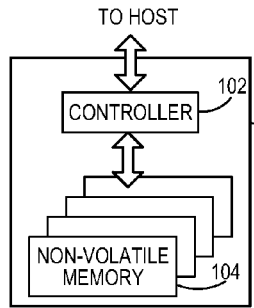
FIG. 1A is a block diagram of an example non-volatile memory system.

The present disclosure is directed to systems and methods for performing an adaptive sustain write. In implementations of non-volatile memory systems described below, a controller of the non-volatile memory system is able to utilize over-provisioning memory blocks in addition to user capacity memory blocks, and possibly intermediate storage memory blocks, to accept data from a host system for storage. By utilizing the over-provisioning memory blocks in addition to the user capacity memory blocks and intermediate storage memory blocks, the non-volatile memory system is able to increase an amount of data that the non-volatile memory system is able to receive from the host system for storage for a given period of time in comparison to conventional non-volatile memory systems.

In one embodiment, a method is disclosed. The elements of the method occur in a controller of a non-volatile memory system that is coupled to a host system.

In the method, the controller monitors a rate at which the host system sends user data to the non-volatile memory system for storage and determines that a rate at which the host system sends user data to the non-volatile memory system for storage exceeds a threshold.

The controller stores a first portion of the user data from the host system in one or more user capacity memory blocks of the non-volatile memory system. Additionally, the controller stores a second portion of the user data from the host system in one or more over-provisioning memory blocks of the non-volatile memory system after determining that the rate at which the host system sends data to the non-volatile memory system for storage exceeds the threshold.

In another embodiment, a non-volatile memory system in communication with a host is disclosed. The non-volatile memory system comprises a non-volatile memory and processing circuitry in communication with the non-volatile memory.

The non-volatile memory comprises memory blocks that are associated with a host logical block address and memory blocks that are not associated with a host logical block address.

The processing circuitry is configured to determine whether a speed at which a host sends user data to the non-volatile memory system for storage exceeds a rate at which the processing circuitry is able to store data in memory blocks associated with a host logical block address. The processing circuitry is further configured to, after determining that the speed at which the host sends user data to the non-volatile memory system for storage exceeds the rate at which the processing circuitry is able to store data in memory blocks associated with a host logical block address, store at least part of the user data in one or more memory blocks that are not associated with a host logical block address.

In yet another embodiment, another method is disclosed. The elements of the method occur in a controller of a non-volatile memory system that is coupled to a host system.

In the method, the controller monitors a rate at which the host system sends user data to the non-volatile memory system for storage. The controller determines to store at least part of the user data received from the host system for a given period of time in one or more intermediate storage memory blocks and one or more over-provisioning memory blocks based on an amount of data that the controller is able to store in one or more user capacity memory blocks in the given period of time.

During the given period of time, the controller stores a first portion of the user data in the one or more user capacity memory blocks, stores a second portion of the user data in the one or more intermediate storage memory blocks, and stores a third portion of the user data in the one or more over-provisioning memory blocks.

Other embodiments and implementations are possible, and each of the embodiments can be used alone or together in combination. Accordingly, various embodiments and implementations will be described with reference to the attached drawings.

Figure 1B:
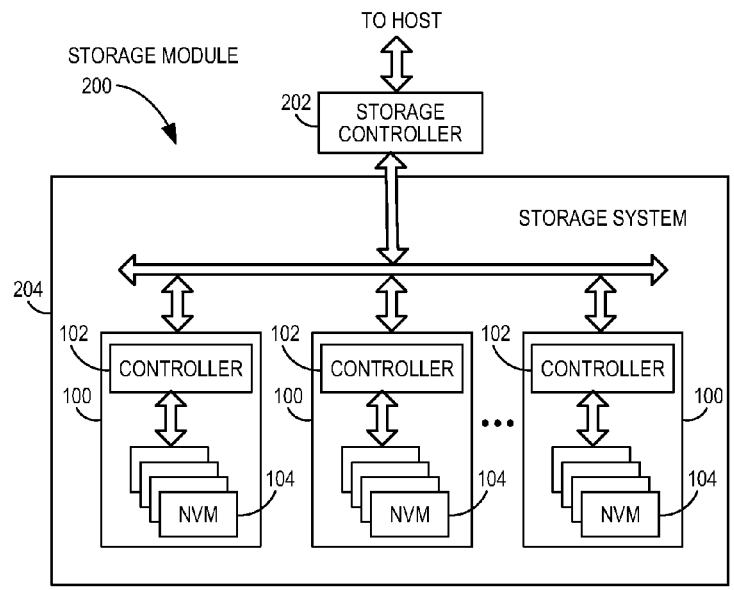
FIG. 1B is a block diagram illustrating an exemplary storage module.
Figure 1C:
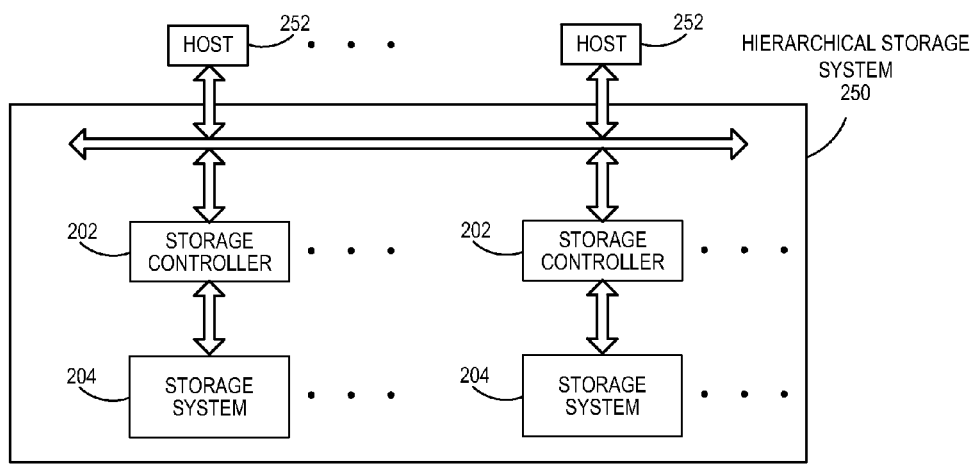
FIG. 1C is a block diagram illustrating a hierarchical storage system.

Memory systems suitable for use in implementing aspects of these embodiments are shown in FIGS. 1A-1C. FIG. 1A is a block diagram illustrating a non-volatile memory system according to an embodiment of the subject matter described herein. Referring to FIG. 1A, non-volatile memory system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory technologies, now known or later developed. Also, the memory cells can be arranged in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system.

Although, in the example illustrated in FIG. 1A, non-volatile memory system 100 includes a single channel between controller 102 and non-volatile memory die 104, the subject matter described herein is not limited to having a single memory channel. For example, in some NAND memory system architectures, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

FIG. 1B illustrates a storage module 200 that includes plural non-volatile memory systems 100. As such, storage module 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
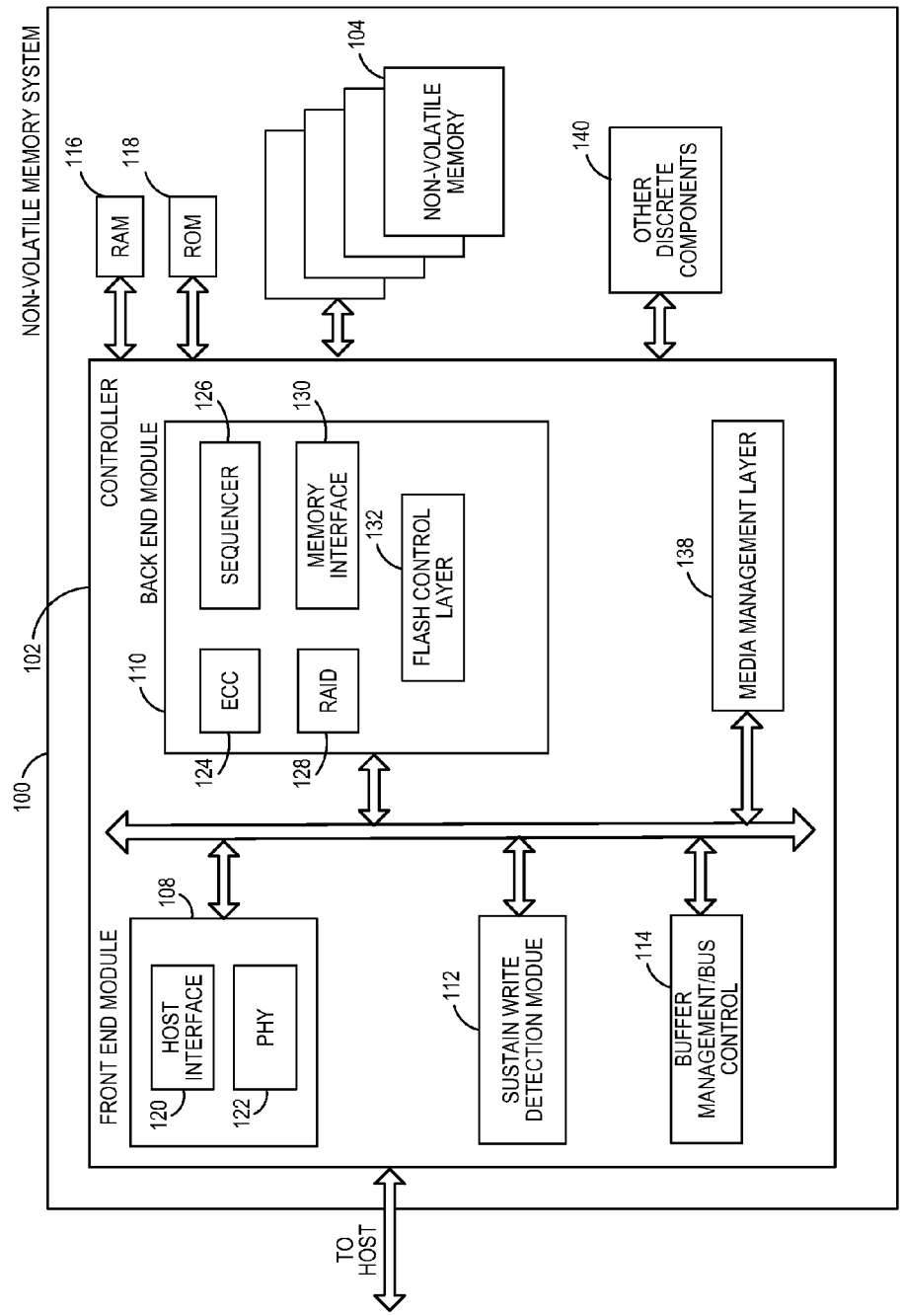
FIG. 2A is a block diagram illustrating exemplary components of a controller of a non-volatile memory system.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Modules of the controller 102 may include a sustained write detection module 112 that is present on the same die as the controller 102. As explained in more detail below in conjunction with FIGS. 7 and 8, the sustained write detection module 112 of the may perform operations that direct the controller 102 to utilize over-provisioning memory blocks for the temporary storage of data from a host system in order to increase an amount of data that the non-volatile memory system is able to receive from the host system for storage for a given period of time. Further, the sustained write detection module 112 may perform operations to adjust an amount of over-provisioning memory blocks that are utilized to store data from the host system. In some implementations, the sustained write detection module 112 may make these determinations in real time based on factors such as the amount of data the host system sends to the non-volatile memory system and the scheduling of background operations at the non-volatile memory system.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller. Further, in some implementations, the controller 102, RAM 116, and ROM 118 may be located on separate semiconductor die.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a dual data rate (DDR) interface, such as a Toggle Mode 200, 400, or 800 interface. A flash control layer 132 controls the overall operation of back end module 110.

Additional components of system 100 illustrated in FIG. 2A include media management layer 138 to perform wear leveling of memory cells of non-volatile memory die 104. System 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
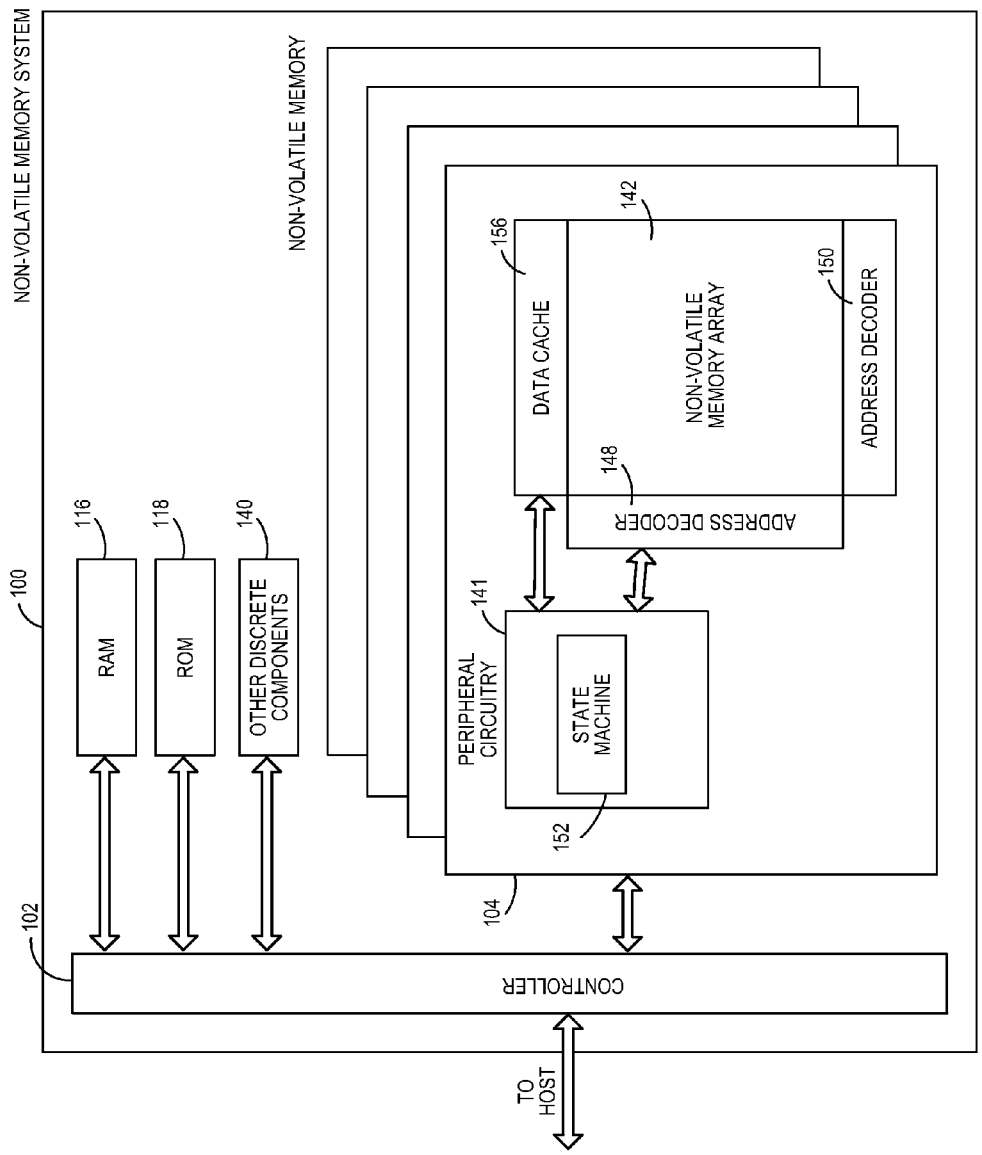
FIG. 2B is a block diagram illustrating exemplary components of a non-volatile memory of a non-volatile memory storage system.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. Non-volatile memory die 104 further includes a data cache 156 that caches data.

Each non-volatile memory die 104 may contain an array of memory cells organized into multiple planes. An example NAND array is illustrated in FIG. 3.

Figure 3:
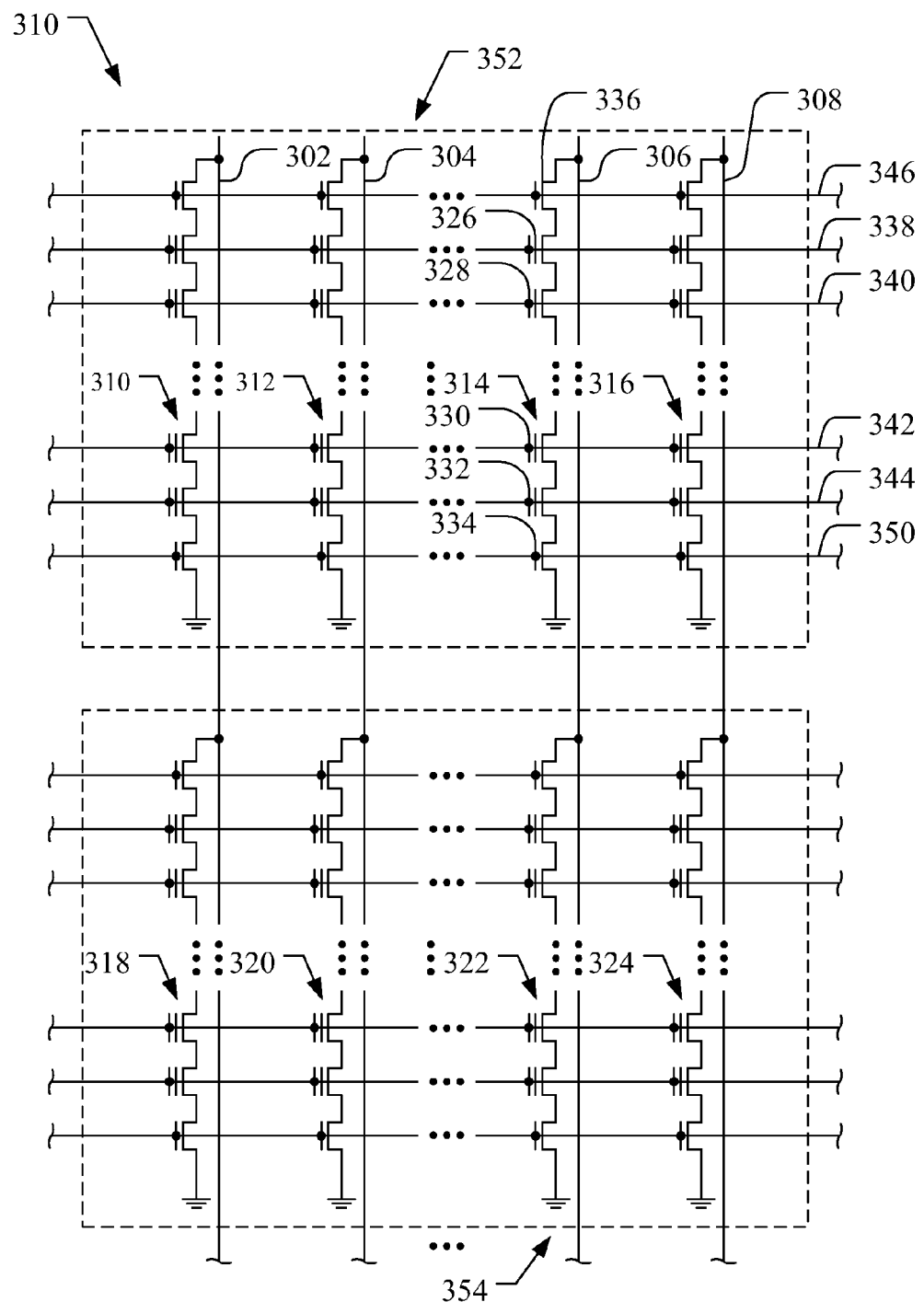
FIG. 3 is a representative circuit diagram of a memory cell array.

While a large number of global bit lines are provided in a NAND array, only four such lines 302-308 are shown in FIG. 3 for simplicity of explanation. A number of series connected memory cell strings 310-324 are connected between one of these bit lines and a reference potential. Using the memory cell string 314 as representative, a plurality of charge storage memory cells 326-332 are connected in series with select transistors 334 and 336 at either end of the string. When the select transistors of a string are rendered conductive, the string is connected between its bit line and the reference potential. One memory cell within that string is then programmed or read at a time.

Word lines 338-344 of FIG. 3 individually extend across the charge storage element of one memory cell in each of a number of strings of memory cells, and gates 346 and 350 control the states of the select transistors at each end of the strings. The memory cell strings that share common word and control gate lines 338-350 are made to form a block 352 of memory cells that are erased together. This block of cells contains the minimum number of cells that are physically erasable at one time. One row of memory cells, those along one of the word lines 338-344, are programmed at a time.

Conventionally, the rows of a NAND array are programmed in a prescribed sequential order, in this case beginning with the row along the word line 344 closest to the end of the strings connected to ground or another common potential. The row of memory cells along the word line 342 is programmed next, and so on, throughout the block 352.

A second block 354 is similar, its strings of memory cells being connected to the same global bit lines as the strings in the first block 352 but having a different set of word and control gate lines. The word and control gate lines are driven to their proper operating voltages by row control circuits. If there is more than one plane in the system, one memory architecture uses common word lines extending between them. There can alternatively be more than two planes that share common word lines. In other memory architectures, the word lines of individual planes are separately driven.

The memory cells may be operated to store two levels of charge so that a single bit of data is stored in each cell. This is typically referred to as a binary or single level cell (SLC) memory. Alternatively, the memory cells may be operated to store more than two detectable levels of charge in each charge storage element or region, thereby to store more than one bit of data in each. This latter configuration is referred to as multi level cell (MLC) memory. Both types of memory cells may be used in a memory. For example, binary flash memory may be used for caching data and MLC memory may be used for longer term storage. The charge storage elements of the memory cells are most commonly conductive floating gates but may alternatively be non-conductive dielectric charge trapping material.

In implementations of MLC memory operated to store two bits of data in each memory cell, each memory cell is configured to store four levels of charge corresponding to values of "11," "01," "10," and "00." Each bit of the two bits of data may represent a page bit of a lower page or a page bit of an upper page, where the lower page and upper page span across a series of memory cells sharing a common word line. Typically, the less significant bit of the two bits of data represents a page bit of a lower page and the more significant bit of the two bits of data represents a page bit of an upper page.

Figure 4:
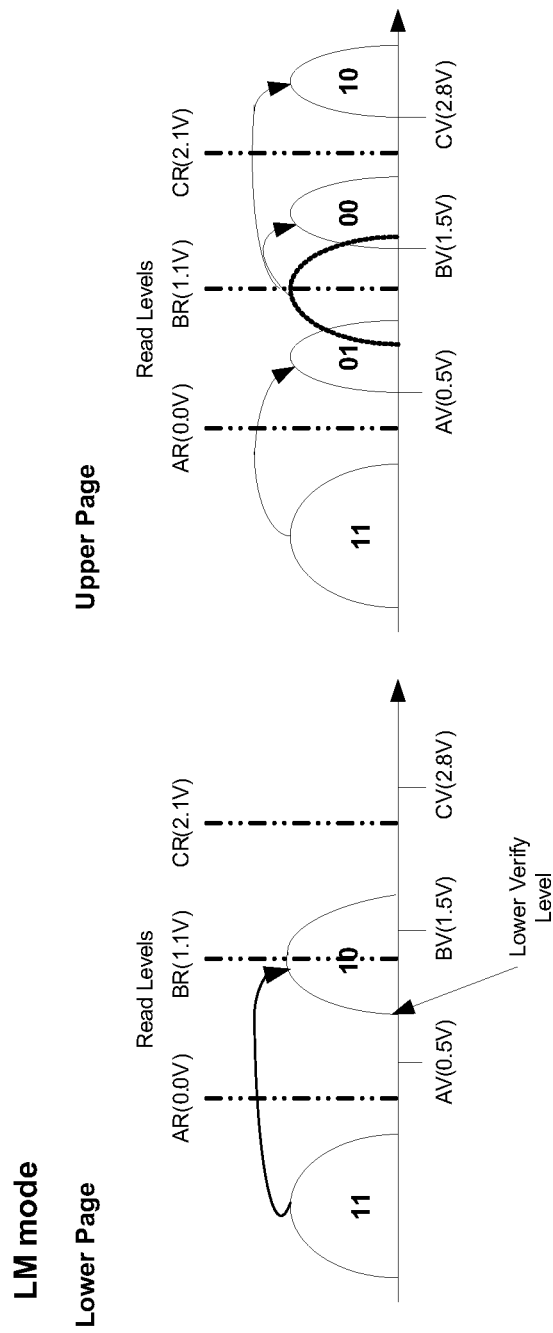
FIG. 4 illustrates charge levels in a MLC memory operated to store two bits of data in a memory cell.

FIG. 4 illustrates one implementation of the four charge levels used to represent two bits of data in a memory cell. A value of "11" corresponds to an un-programmed state of the memory cell. When programming pulses are applied to the memory cell to program a page bit of the lower page, the level of charge is increased to represent a value of "10" corresponding to a programmed state of the page bit of the lower page.

For a page bit of an upper page, when the page bit of the lower page is programmed (a value of "10"), programming pulses are applied to the memory cell for the page bit of the upper page to increase the level of charge to correspond to a value of "00" or "10" depending on the desired value of the page bit of the upper page. However, if the page bit of the lower page is not programmed such that the memory cell is in an un-programmed state (a value of "11"), applying programming pulses to the memory cell to program the page bit of the upper page increases the level of charge to represent a value of "01" corresponding to a programmed state of the page bit of the upper page.

Figure 5:
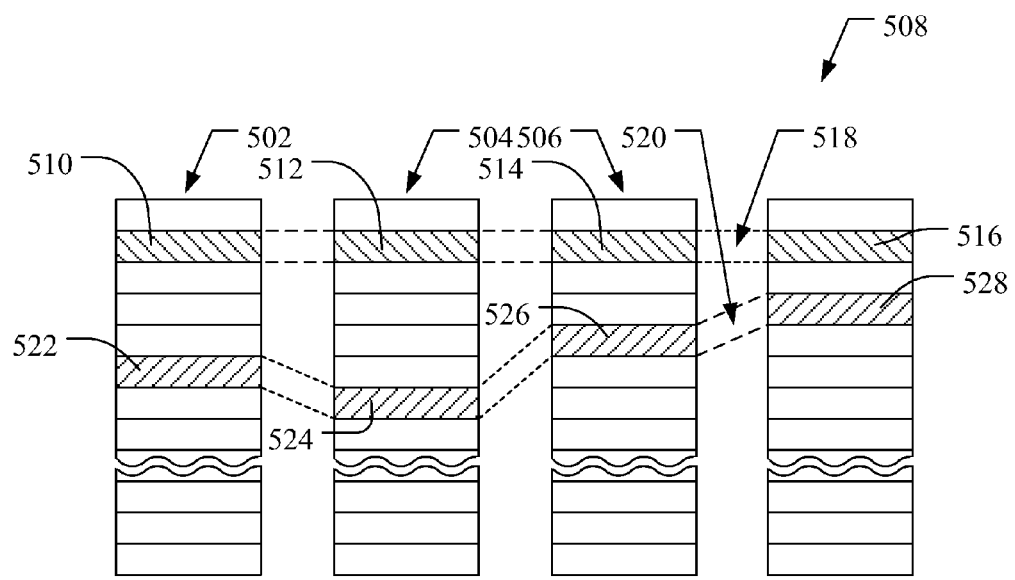
FIG. 5 illustrates an example physical memory organization of a memory bank.

FIG. 5 conceptually illustrates a multiple plane arrangement showing four planes 502-508 of memory cells. These planes 502-508 may be on a single die, on two die (two of the planes on each die) or on four separate die. Of course, other numbers of planes, such as 1, 2, 8, 16 or more may exist in each die of a system. The planes are individually divided into blocks of memory cells shown in FIG. 5 by rectangles, such as blocks 510, 512, 514 and 516, located in respective planes 502-508. There can be dozens or hundreds or thousands or more of blocks in each plane.

As mentioned above, a block of memory cells is the unit of erase, the smallest number of memory cells that are physically erasable together. Some non-volatile memory systems, for increased parallelism, operate the blocks in larger metablock units. However, other memory systems may utilize asynchronous memory die formations rather than operating in larger metablock units.

In non-volatile memory systems utilizing metablock units, one block from each plane is logically linked together to form the metablock. The four blocks 510-516 are shown to form one metablock 518. All of the cells within a metablock are typically erased together. The blocks used to form a metablock need not be restricted to the same relative locations within their respective planes, as is shown in a second metablock 520 made up of blocks 522-528. Although it is usually preferable to extend the metablocks across all of the planes, for high system performance, the non-volatile memory systems can be operated with the ability to dynamically form metablocks of any or all of one, two or three blocks in different planes. This allows the size of the metablock to be more closely matched with the amount of data available for storage in one programming operation.

Figure 6:
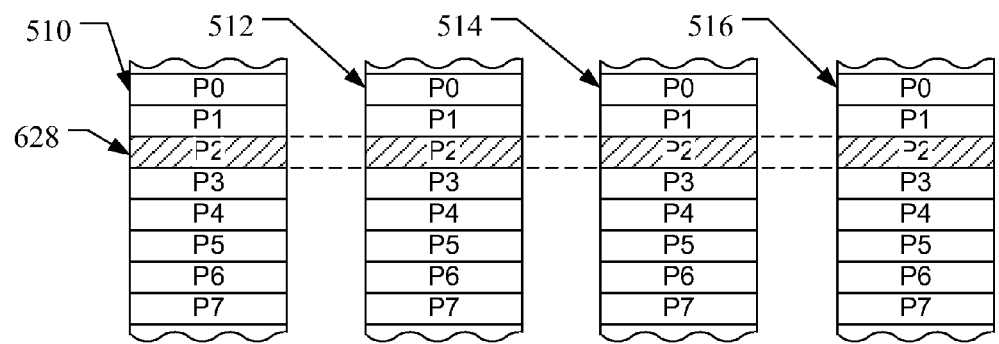
FIG. 6 shows an expanded view of a portion of the physical memory of FIG. 5.

The individual blocks are in turn divided for operational purposes into pages of memory cells, as illustrated in FIG. 6. The memory cells of each of the blocks 510-516, for example, are each divided into eight pages P0-P7. Alternatively, there may be 16, 32, 64 or more pages of memory cells within each block. The page is the unit of data programming and reading within a block, containing the minimum amount of data that are programmed or read at one time. However, in order to increase the memory system operational parallelism, such pages within two or more blocks may be logically linked into metapages. A metapage 628 is illustrated in FIG. 6, being formed of one physical page from each of the four blocks 510-516. The metapage 628, for example, includes the page P2 in each of the four blocks but the pages of a metapage need not necessarily have the same relative position within each of the blocks.

As mentioned above, in implementations of non-volatile memory systems described below, a controller of the non-volatile memory system is able to utilize over-provisioning memory blocks in addition to user capacity memory blocks to accept data from a host system for storage. By utilizing the over-provisioning memory blocks in addition to the user capacity memory blocks and intermediate storage memory blocks, the non-volatile memory system is able to increase an amount of data that the non-volatile memory system is able to receive from the host system for storage for a given period of time in comparison to conventional non-volatile memory systems.

In general, user capacity memory blocks are memory blocks in a memory array that are allocated for user capacity, such as for storing user data. User capacity memory blocks are typically associated with a host logical block address.

Over-provisioning memory blocks are memory blocks in a memory array that are spare memory blocks and are typically not associated with a host logical block address. A controller may utilize over-provisioning memory blocks in performing background operations such as data reconciliation, garbage collection operations, replacement of grown defect blocks (i.e., memory blocks where a defect occurs after manufacture), or any other operation at the non-volatile memory system that may benefit from the use of excess memory blocks.

Over-provisioning memory blocks may be located anywhere in a range of a memory array structure and may take up varying storage capacity according to memory system requirements and capability. For example, in some implementations, a memory system may reserve 5 to 10% of its non-volatile memory blocks for over-provisioning memory blocks.

In some implementations of the disclosed non-volatile memory system, the non-volatile memory of the memory system utilizes a three level cell (TLC) memory block architecture, where memory blocks are configured to operate as hybrid memory blocks according to system requirements and operation. For example, the hybrid memory blocks may operate in either a single level cell (SLC) mode or in a multi level cell (MLC) mode.

When operating in a SLC mode, a TLC memory block is operated as if it were a SLC memory block. SLC memory blocks provide increased performance in writing data to and reading data from a memory block in comparison to TLC memory blocks but may only provide a third of the storage of a TLC memory block. Moreover although SLC memory blocks may only provide a third of the storage of a TLC memory block, SLC memory blocks have much more endurance than TLC memory blocks (sometimes up to X50) and are much more reliable in withstanding TLC memory block phenomena's like: Data Retention and Read Disturb.

When operating in a MLC mode, a TLC memory block is operated as a MLC memory block. As mentioned above, TLC memory blocks provide three times the storage capacity as a SLC memory bock, but at the cost of reduced performance in writing data to and reading data from a memory block. MLC memory blocks provide higher performance and higher endurance than TLC memory blocks (sometimes up to X10) and offer improvements in sustaining memory blocks phenomena as mentioned above like: Data Retention and Read Disturb.

The non-volatile memory system generally utilize TLC memory blocks operating in MLC mode for user capacity memory blocks and utilize TLC memory blocks operating in SLC for over-provisioning memory blocks. By doing so the non-volatile memory system is able to provide increased capacity for the storage of user data while being able to provide increased performance for background operations within the memory system.

SLC and MLC memory blocks are consider to have a greater endurance than TLC memory blocks, thereby providing the ability to better sustain memory block phenomena's, especially in difficult conditions such as high temperatures. The combined usage of SLC and MLC memory blocks improve an ability of a memory system to handle user data after power-down and fast recovery as per the SLC and MLC memory blocks advantages mentioned above.

As discussed in more detail below, when a host system that is coupled to the non-volatile memory system sends user data to the memory system for storage, a controller of the memory system directly stores the user data in the user capacity blocks. However, when the host system sends data to the non-volatile memory system for storage at a rate that is greater than a rate at which the non-volatile memory may store data to user capacity memory blocks, the controller may utilize the over-provisioning memory blocks in order to increase an amount of data that the non-volatile memory system is able to receive from the host system for storage for a given period of time. During the data burst the controller may directly store data from the host in the user capacity memory blocks while in parallel storing data from the host in the over-provisioning memory blocks. The controller then performs background operations at a later time to move the user data out of the over-provisioning memory blocks and into user capacity memory blocks.

The amount of over-provisioning memory blocks that the controller utilizes to store user data from the host system may be predefined or the controller may dynamically adjust the amount of over-provisioning blocks that the memory system may utilize to store data from the host system. For example, after an initial burst of data from the host system, the memory system may reduce the amount of over-provisioning memory blocks that may be utilized to store data from the host system in a second burst of data in order to increase an amount of workspace to perform background operations such as moving user data from over-provisioning memory blocks to user capacity memory blocks.

In some implementations, a non-volatile memory system may include intermediate storage memory blocks. Intermediate storage memory blocks are neither user capacity memory blocks nor over-provisioning memory blocks. Instead, intermediate storage memory blocks are SLC memory blocks that are reserved solely for the temporary storage of data received from a host system when the host systems sends data to the non-volatile memory system at a rate greater than the controller is able to directly storage user data from the host directly to user capacity memory blocks. It will be appreciated that not all non-volatile memory systems include intermediate storage memory blocks.

Figure 7:
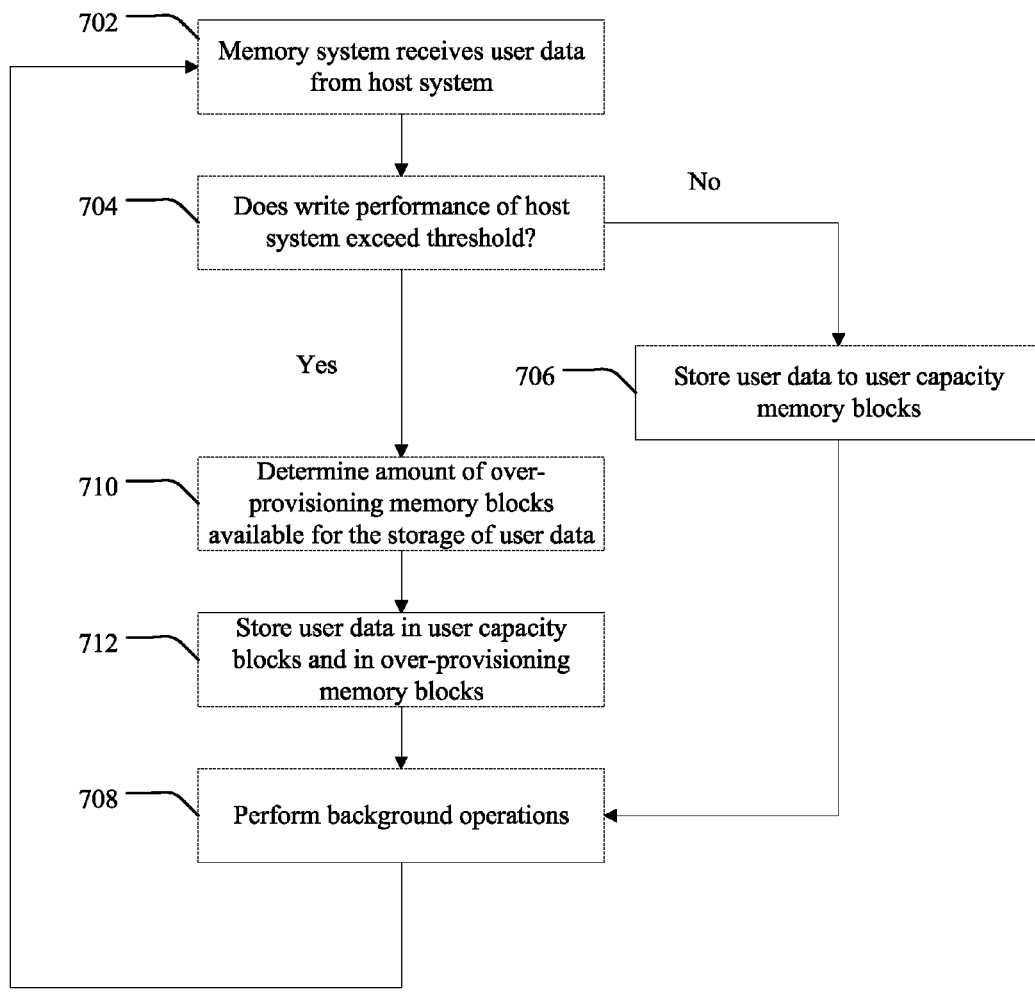
FIG. 7 is a flow chart of one implementation of a method for performing an adaptive sustain write at a non-volatile memory system that does not include intermediate storage memory blocks.
Figure 8:
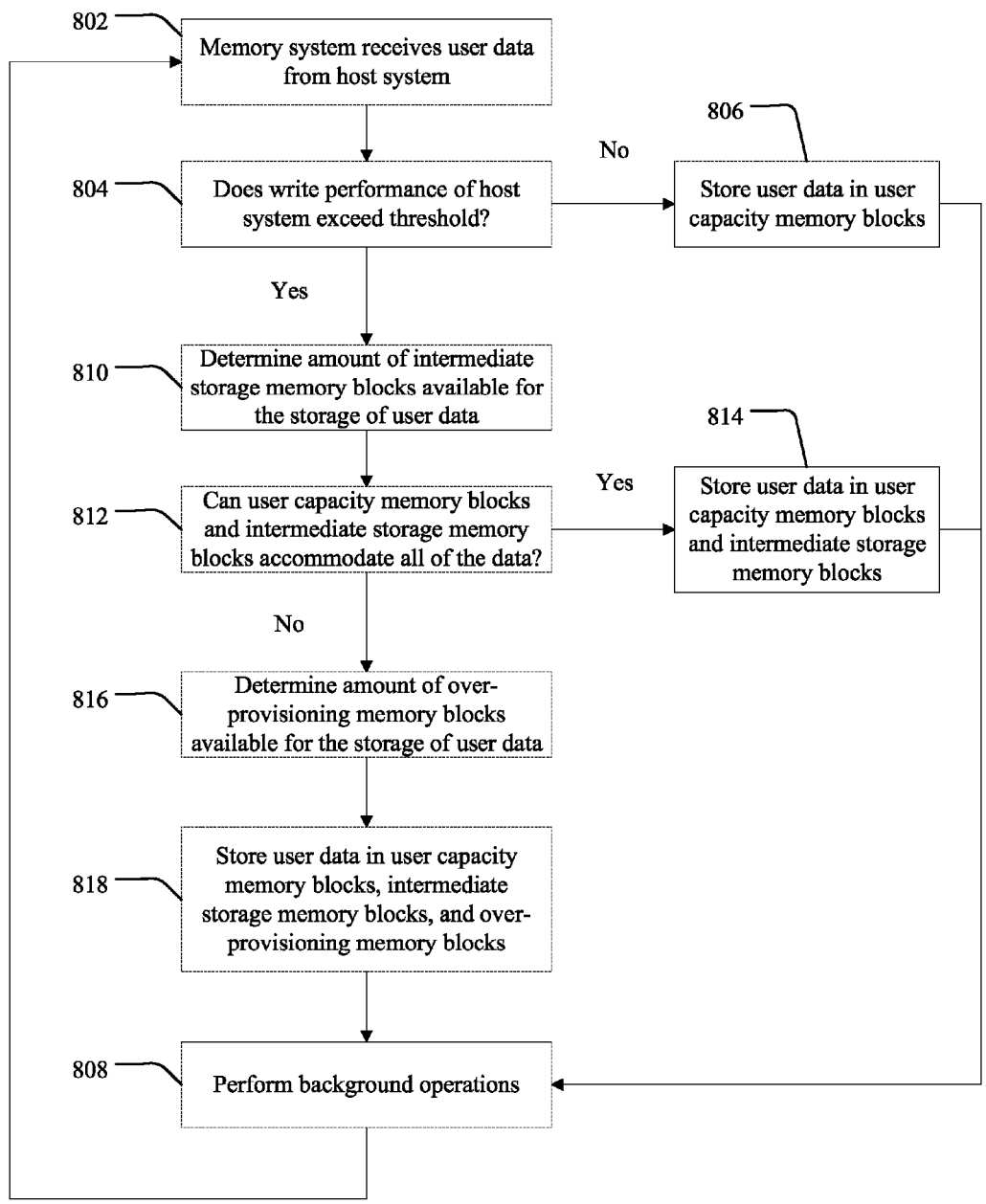
FIG. 8 is a flow chart of one implementation of a method for performing an adaptive sustain write at a non-volatile memory system that includes intermediate storage memory blocks.

FIGS. 7 and 8 are flow charts of implementations of methods for performing an adaptive sustain write at a non-volatile memory system. The discussion below in conjunction with FIG. 7 describes utilizing over-provisioning memory blocks to perform an adaptive sustain write in a non-volatile memory system that does not include intermediate storage memory blocks. The discussion below in conjunction with FIG. 8 describes utilizing over-provisioning memory blocks to perform an adaptive sustain write in a non-volatile memory system that does include intermediate storage memory blocks.

Referring to FIG. 7, the method begins at step 702 with a non-volatile memory system receiving user data from a host system for storage. At step 704, a sustained write detection module of a controller of the non-volatile memory system monitors a rate at which the host system sends user data to the memory system for storage to determine whether the rate at which the host system sends user data to the memory system exceeds a threshold.

For example, in one implementation, a non-volatile memory system may be able to directly store user data from a host system to user capacity memory blocks at 50 megabytes per second. Therefore, the threshold may be set at 50 megabytes per second to ensure that if the host performance exceeds the rate at which the controller can directly store user data to user capacity memory blocks, the non-volatile memory system determines whether it can utilize over-provisioning memory blocks to match the performance of the host.

When the sustained write detection module determines at step 704 that the rate at which the host system sends data to the memory system does not exceed the threshold, the memory system is able to directly store user data in the user capacity memory blocks at the same rate as the host is sending user data to the memory system for storage. Therefore, a controller of the memory system directly stores the received data to the user capacity blocks at step 706.

At step 708, the controller may simultaneously perform background operations such as moving user data from the over-provisioning memory blocks to user capacity memory blocks or performing garbage collection operations. The sustained write detection module continues to monitor the rate at which the host system sends data to the memory system for storage at step 704.

When the sustained write detection module alternatively determines at step 704 that the rate at which the host system sends data to the memory system exceeds the threshold, the host system is sending data to the memory system for storage at a rate greater than the controller is able to directly store data in the user capacity blocks. Therefore, the sustained write detection module determines whether the non-provisional memory system may utilize over-provisioning memory blocks for the temporary storage of user data from the host systems.

At step 710, the sustained write detection module determines an amount of over-provisioning memory blocks to utilize for the temporary storage of user data from the host system. The sustained write detection module may determine an amount of over-provisioning memory blocks that the memory system may utilize to temporarily store user data from the host system based on factors such an amount of over-provisioning memory blocks already temporarily storing user data from the host, a number of background operations currently being performed at the memory system that utilizes the over-provisioning blocks, a number of background operation scheduled to be performed at the memory system that utilize the over-provisioning blocks, a resulting overall system performance based on an amount of remaining over-provisioning memory blocks, and/or any other factor that may restrict a number of over-provisioning blocks that may be utilized to temporarily store data from the host system.

For example, the sustained write detection module may determine that 40% of the total over-provisioning memory blocks may be utilized to store data from the host system.

The sustained write detection module may reserve the other 60% of the total over-provisioning memory blocks for utilization with background operations such as moving user data from the over-provisioning memory blocks to user capacity blocks. Accordingly, the sustained write detection module determines an amount of over-provisioning memory blocks that may currently be utilized to store user data based on the 40% of total over-provisioning memory blocks that are available to store user data from the host and a number of over-provisioning memory blocks that are already temporarily storing data from the host system.

It will be appreciated that the sustained write detection module may dynamically adjust the percentages of the total over-provisioning memory blocks that may be utilized to store user data from the host system or that is reserved for background operations based on a desired performance of the memory system. However, in other implementations, the amount of the total over-provisioning memory block that may be utilized to store data from the host system is predefined.

At step 712, the controller of the memory system stores user data from the host system in user capacity memory blocks and in over-provisioning memory blocks. In some implementations, the controller stores the user data from the host system in parallel to the user capacity blocks and the over-provisioning memory blocks.

At step 708, the controller may simultaneously perform background operations such as moving user data from the over-provisioning memory blocks to user capacity memory blocks or performing garbage collection operations.

It will be appreciated that the above-recited steps are repeated as the host system continues to send user data to the memory system for storage. The sustained write detection module continues to monitor the rate at which the host system sends data to the memory system for storage and adjusts whether or not to utilize over-provisioning memory blocks to try to match the performance of the host system.

Continuing with the illustrative example above, the sustained write detection module may determine that the host system sends 90 megabytes per second to the non-volatile memory system. Since the threshold is set at 50 megabytes per second based on the ability of the controller to directly store user data to the user capacity memory blocks, the sustained write detection module determines whether the over-provisioning memory blocks can accommodate the remaining 40 megabytes per second. The sustained write detection module may determine that the over-provisioning memory blocks can store the excess data such that for a given second, the controller directly stores 50 megabytes of the user data in the user capacity memory blocks while in parallel stores 40 megabytes of the user data in the over-provisioning memory blocks.

As the host system continues to send 90 megabytes of user data per second to the memory system and the controller stores the data to the user capacity memory blocks and the over-provisioning memory blocks, the controller also may attempt to move previously received data that was received from the host system from the over-provisioning memory blocks to the user capacity memory blocks. When the controller is not able to move a sufficient amount of data from the over-provisioning memory blocks to the user capacity blocks, the write sustained write detection module may need to reduce in real time the amount of over-provisioning memory blocks that the controller may utilize to store data from the host system such that the memory system is not able to accommodate the full 90 megabytes per second from the host system.

However, as the host system reduces the amount of data sent to the memory system in a given period of time, over time the controller is able to move the received user data from the over-provisioning memory blocks to the user capacity memory blocks. As more of the over-provisioning memory blocks become available, the sustained write detection module may increase the amount of over-provisioning memory blocks that are able to store data from the host system to increase the amount of user data that the memory system may accommodate from the host system in a given period of time.

While the above discussion in conjunction with FIG. 7 describes utilizing over-provisioning memory blocks to perform an adaptive sustain write in a non-volatile memory system that does not include intermediate storage memory blocks, the discussion below in conjunction with FIG. 8 describes utilizing over-provisioning memory blocks to perform an adaptive sustain write in a non-volatile memory system that does include intermediate storage memory blocks.

The method begins at step 802 with a non-volatile memory system receiving user data from a host system for storage. At step 804, a sustained write detection module of a controller of the non-volatile memory system monitors a rate at which the host system sends user data to the memory system for storage to determine whether the rate at which the host system sends user data to the memory system exceeds a first threshold.

As in the illustrative example above, in one implementation, a non-volatile memory system may be able to directly store user data from a host system to user capacity memory blocks at 50 megabytes per second. Therefore, the first threshold may be set at 50 megabytes per second to ensure that if the host performance exceeds the rate at which the controller can store user data to user capacity memory blocks, the non-volatile memory system determines whether it can utilize other memory blocks such as over-provisioning memory blocks and intermediate storage memory blocks to match the performance of the host.

When the sustained write detection module determines that the rate at which the host system sends data to the memory system does not exceed the threshold, the memory system is able directly store user data in the user capacity memory blocks at the same rate as the host system is sending user data to the memory system for storage. Therefore, a controller of the memory system directly stores the received data to the user capacity blocks at step 806.

At step 808, the controller may perform background operations in parallel with the storage of data to the user capacity memory blocks such as moving data from the intermediate storage memory blocks and/or the over-provisioning memory blocks to user capacity memory blocks. The sustained write detection module then continues to monitor the rate at which the host system sends user data to the memory system for storage at step 804.

When the sustained write detection module alternatively determines at step 804 that the rate at which the host system sends data to the memory system exceeds the first threshold, the host system is sending data to the memory system for storage at a rate greater than the controller is able to directly store data in the user capacity memory blocks. Therefore, the sustained write detection module determines whether the non-provisional memory system may utilize intermediate storage memory blocks and/or over-provisioning memory blocks for the temporary storage of user data from the host systems.

At step 810, the sustained write detection module determines an amount of intermediate storage memory blocks that are available to temporarily store data from the host device. At step 812, the sustained write detection module determines whether the rate at which the host system sends user data to the memory system exceeds an amount of data that the controller is able to store to user capacity memory blocks in addition to the amount of intermediate storage memory blocks that are available to temporarily store data from the host system as identified at step 810.

Continuing with the illustrative example above, the sustained write detection module may determine that the intermediate storage memory blocks are able to temporarily store 20 megabytes of data per second. Therefore, if the controller is able to directly store user data from the host system to user capacity memory blocks at 50 megabytes per second, the adaptive sustained write detection module determines whether the host system is sending more than 70 megabytes of user data per second to the non-volatile memory system for storage.

When the sustained write detection module determines at step 812 that the rate at which the host system sends user data to the memory system does not exceeds an amount of data that the controller is able to store to user capacity memory blocks in addition to an amount of intermediate storage memory blocks available, the sustained write detection module determines that the intermediate storage memory blocks can accommodate the excess user data received from the host system. Therefore, at step 814, the controller stores data from the host system in user capacity memory blocks and in intermediate storage memory blocks. In some implementations, the controller stores the user data from the host system in parallel to the user capacity blocks and the intermediate storage memory blocks.

At step 808, the controller may perform background operations in parallel with the storage of data to the user capacity memory blocks and the intermediate storage memory blocks such as moving data from the intermediate storage memory blocks and/or the over-provisioning memory blocks to user capacity memory blocks.

When the sustained write detection module alternatively determines at step 812 that the rate at which the host system sends user data to the memory system does exceeds an amount that the controller is able to store user data to user capacity memory blocks in addition to an amount of inter- mediate storage memory blocks available, the sustained write detection module determines that the intermediate storage memory blocks cannot accommodate the excess data received from the host system. Therefore, at step 816, the sustained write detection module determines an amount of over-provisioning memory blocks to utilize for the temporary storage of user data from the host system.

As discussed above, the sustained write detection module may determine an amount of over-provisioning memory blocks that the memory system may utilize to temporarily store user data from the host system based on factors such an amount of over-provisioning memory blocks already temporarily storing user data from the host, a number of background operations currently being performed at the memory system that utilizes the over-provisioning blocks, a number of background operation scheduled to be performed at the memory system that utilize the over-provisioning blocks, and/or any other factor that may restrict a number and type of over-provisioning blocks that may be utilized to temporarily store data from the host device.

At step 818, the controller of the memory system stores data from the host system in user capacity memory blocks, in intermediate storage memory blocks, and in over-provisioning memory blocks. In some implementations, the controller stores the user data from the host system in parallel to the user capacity blocks, the intermediate storage memory blocks, and the over-provisioning memory blocks.

At step 808, the controller may perform background operations in parallel with the storage of data to the user capacity memory blocks, the intermediate storage memory blocks, and the over-provisioning memory blocks such as moving data from the intermediate storage memory blocks and/or the over-provisioning memory blocks to user capacity memory blocks.

It will be appreciated that the above-recited steps are repeated as the host system continues to send user data to the memory system for storage. The sustained write detection module continues to monitor the rate at which the host system sends data to the memory system for storage and adjusts whether or not to utilize over-provisioning memory blocks and/or intermediate storage memory blocks to try to match the performance of the host system.

Continuing with the illustrative example above, the sustained write detection module may determine that the host system sends 90 megabytes per second to the non-volatile memory system. Since the threshold is set at 50 megabytes per second based on the ability of the controller to directly store user data to the user capacity memory block, the sustained write detection module determines whether the intermediate storage memory blocks can accommodate the remaining 40 megabytes per second.

The sustained write detection module may determine that the intermediate storage memory blocks can only accommodate 30 megabytes per second. Therefore, the sustained write detection module determines whether the over-provisioning memory blocks can accommodate the remaining 10 megabytes per second. The sustained write detection module may determine that the over-provisioning memory blocks can store the excess data such that for a given second, the controller directly stores 50 megabytes of data in the user capacity memory blocks, stores 30 megabytes of data in the intermediate storage memory blocks, and stores 10 megabytes of data in the over-provisioning memory blocks.

As the host system continues to send 90 megabytes per second to the memory system and the controller stores the data to the user capacity memory blocks, the intermediate storage memory blocks, and the over-provisioning memory blocks, the controller also may attempt to move previously received data received from the host system from the over-provisioning memory blocks and/or the intermediate storage memory blocks to the user capacity memory blocks.

When the controller is not able to move a sufficient amount of data from the over-provisioning memory blocks and/or the intermediate storage memory blocks to the user capacity blocks, the write sustained write detection module may need to reduce in real time the amount of over-provisioning memory blocks and/or the amount of intermediate storage memory blocks that the controller utilizes to store data from the host system such that the memory system is not able to accommodate the full 90 megabytes per second from the host system.

However, as the host system reduces the amount of data sent to the memory system in a given period of time, over time the controller is able to move the received data from the over-provisioning memory blocks and/or the intermediate storage memory blocks to the user capacity memory blocks. As more of the over-provisioning memory blocks and/or the intermediate storage memory blocks become available, the sustained write detection module may increase the amount of over-provisioning memory blocks and/or intermediate storage memory blocks that are able to store user data from the host to increase the amount of data that the memory system may accommodate from the host system in a given period of time.

FIGS. 1-8 illustrate systems and methods for performing an adaptive sustain write. As described above, implementations of non-volatile memory systems may utilize over-provisioning memory blocks in addition to user capacity memory blocks to accept data from a host system for storage. By utilizing the over-provisioning memory blocks in addition to the user capacity memory blocks and intermediate storage memory blocks, the non-volatile memory systems are able to increase an amount of data that the non-volatile memory systems are able to receive from host systems for a given period of time for storage in comparison to conventional non-volatile memory systems.

It is intended that the foregoing detailed description be regarded as illustrative rather than limiting, and that it be understood that it is the following claims, including all equivalents, that are intended to define the spirit and scope of this invention.

For example, in the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

The invention claimed is:

1. In a controller of a non-volatile memory system that is coupled to a host system, a method comprising:
   monitoring a rate at which the host system sends user data to the non-volatile memory system for storage;
   determining that the rate at which the host system sends user data to the non-volatile memory system for storage exceeds a threshold;
   storing a first portion of the user data from the host system in one or more user capacity memory blocks of the non-volatile memory system; and
   storing a second portion of the user data from the host system in one or more over-provisioning memory blocks of the non-volatile memory system after determining that the rate at which the host system sends data to the non-volatile memory system for storage exceeds the threshold.

2. The method of claim 1, wherein the threshold is set based on a speed at which the controller is able to store data to user capacity memory blocks.

3. The method of claim 1, further comprising:
   storing a third portion of the user data from the host system in one or more intermediate storage memory blocks of the non-volatile memory system after determining that the rate at which the host system sends data to the non-volatile memory system for storage exceeds the threshold.

4. The method of claim 1, wherein the one or more user capacity memory blocks are utilized to store the first portion of the user data while the one or more over-provisioning memory block are utilized to store the second portion of the user data.

5. The method of claim 1, wherein the one or more over-provisioning memory blocks are triple level cell memory blocks configured to operate in a single level cell mode or a multi level cell mode.

6. The method of claim 1, further comprising:
   determining an amount of over-provisioning memory blocks available to store data from the host system after receiving the user data from the host system.

7. The method of claim 6, wherein the amount of over-provisioning memory blocks available to store data from the host system is determined based on one or more scheduled background operations at the non-volatile memory system.

8. The method of claim 1, further comprising:
   after storing the second portion of the user data to the one or more over-provisioning memory blocks, reducing a number of over-provisioning memory blocks that may store data from the host system based on a rate at which the controller is able to move data from the one or more over-provisioning memory blocks to user capacity memory blocks.

9. A non-volatile memory system in communication with a host, the non-volatile memory system comprising:
   a non-volatile memory comprising memory blocks that are associated with host logical block addresses and memory blocks that are not associated with any host logical block addresses; and
   processing circuitry in communication with the non-volatile memory, the processing circuitry configured to:
      determine whether a speed at which a host sends user data to the non-volatile memory system for storage exceeds a rate at which the processing circuitry is able to store data in memory blocks associated with host logical block addresses; and
      after determining that the speed at which the host sends user data to the non-volatile memory system for storage exceeds the rate at which the processing circuitry is able to store data in memory blocks associated with host logical block addresses, store at least part of the user data in one or more memory blocks that are not associated with a host logical block address.

10. The non-volatile memory system of claim 9, wherein the processing circuitry is further configured to move the at least part of the user data stored in the one more memory blocks that are not associated with any host logical block addresses to one or more memory blocks that are associated with host logical block addresses.

11. The non-volatile memory system of claim 9, wherein the non-volatile memory further comprises intermediate storage memory blocks, and wherein the processing circuitry is further configured to:
   store at least part of the user data in one or more intermediate storage blocks in response to determining that the speed at which the host sends user data to the non-volatile memory system for storage exceeds the rate at which the processing circuitry is able to store data in the memory blocks associated with host logical block addresses.

12. The non-volatile memory system of claim 9, wherein the memory blocks that are not associated with any host logical block addresses are triple level cell memory blocks configured to operate in a single level cell mode or a multi level cell mode.

13. The non-volatile memory system of claim 12, wherein when the one or more memory blocks that are not associated with any host logical block addresses store the at least part of the user data, the one or more memory blocks not associated with host logical block addresses are configured to operate in the single level cell mode.

14. The non-volatile memory system of claim 9, wherein the non-volatile memory comprises a silicon substrate and a plurality of memory cells forming at least two memory layers vertically disposed with respect to each other to form a monolithic three-dimensional structure, wherein at least one layer is vertically disposed with respect to the silicon substrate.

15. In a controller of a non-volatile memory system that is coupled to a host system, a method comprising:
   monitoring a rate at which the host system sends user data to the non-volatile memory system for storage;
   determining to store at least part of the user data received from the host system for a given period of time in one or more intermediate storage memory blocks and one or more over-provisioning memory blocks based on an amount of data that the controller is able to store in one or more user capacity memory blocks in the given period of time;
   during the given period of time, storing a first portion of the user data in the one or more user capacity memory blocks, storing a second portion of the user data in the one or more intermediate storage memory blocks, and storing a third portion of the user data in the one or more over-provisioning memory blocks.

16. The method of claim 15, wherein the one or more over-provisioning memory blocks are not associated with any host logical block addresses.

17. The method of claim 15, wherein the one or more over-provisioning memory blocks are multi level cell memory blocks configured to operate in a single level cell mode or a multi level cell mode; and
   wherein when storing the third portion of user data, the one or more over-provisioning memory blocks are configured to operate in the single level cell mode.

18. The method of claim 15, wherein the one or more user capacity memory blocks, the one or more intermediate storage memory blocks, and the one or more over-provisioning memory blocks are utilized to concurrently store portions of the user data.

19. The method of claim 15, further comprising:
   after the given period of time, moving the second portion of data from the one or more intermediate storage memory blocks to one or more user capacity memory blocks and moving the third portion of data from the one or more over-provisioning memory blocks to one or more user capacity memory blocks.

20. The method of claim 15, further comprising:
   after the given period of time, reducing a number of over-provisioning memory blocks that may store data from the host system based on a rate at which the controller is able to move data from the one or more over-provisioning memory blocks to user capacity memory blocks.

* * * * *